Figure 1:
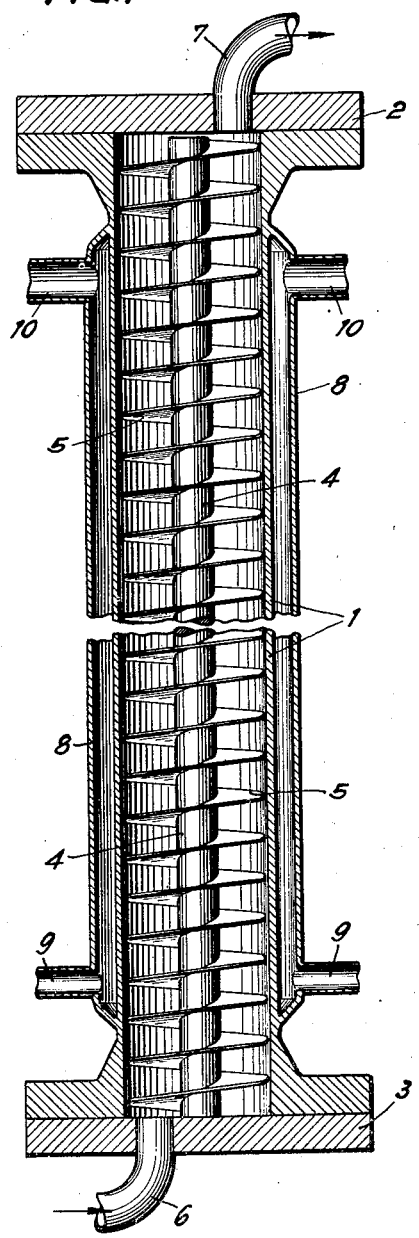

Aug. 13, 1957 H. TRAMM ET AL 2,802,843
OXO SYNTHESIS

Filed Jan. 14, 1953 2 Sheets-Sheet 2

United States Patent Office 2,802,843
Patented Aug. 13, 1957

2,802,843
OXO SYNTHESIS

Heinrich Tramm, Muehlheim-Ruhr-Speldorf, Helmut Kolling, Duisburg-Hamborn, Friedrich Schnur, Oberhausen-Sterkrade, Karl Büchner, Duisburg, Hamborn, Herbert Heger, Oberhausen-Holten, and Ewald Stiebling, Oberhausen-Sterkrade, Germany, assignors to Ruhrchemie Aktiengesellschaft, Oberhausen-Holten, Germany, a German corporation Application January 14, 1953, Serial No. 331,216

Claims priority, application Germany January 17, 1952

2 Claims. (Cl. 260—410.6)

This invention relates to improvements in oxo synthesis. More particularly it relates to an improved process for continuously effecting the oxo synthesis.

As is well known the oxo synthesis is a catalytic addition of carbon monoxide-hydrogen mixtures to unsaturated carbon compounds such as olefinic hydrocarbons at elevated temperatures and pressures for the production of aldehydes and/or alcohols. The catalysts for the oxo synthesis may consist of reduced or unreduced compounds of suitable metals of the 8th group of the periodic system. These compounds may be suspended or dissolved in the starting product for the oxo synthesis. It is also known to use aqueous salt solutions of suitable metals of the 8th group of the periodic system as oxo synthesis catalysts.

In accordance with a new proposal acid cobalt sulphate solutions having a pH below 7 may be used as oxo synthesis catalysts. It is preferable if these cobalt sulphate solutions also contain magnesium sulphate in sufficient quantity so that approximately 20 grams MgO are present for every 10 grams of cobalt per liter of solution. When using this aqueous salt solution as catalyst for the oxo synthesis it is mixed with the starting product in amounts of about 0.05 to 2.0 liters per liter of starting product. Under these conditions a very rapid addition of the carbon monoxide-hydrogen mixtures such as water gas may be obtained under conventional oxo synthesis conditions such as a temperature of about 120 to 220° C. and preferably 140 to 160° C. and pressures in excess of 50 kilograms/sq. cm. and preferably between 100 and 150 kilograms/sq. cm.

The use of the acid cobalt sulphate solutions as catalysts for the oxo synthesis has the marked advantage that the reaction products obtained contain only about 15 to 30 mgs. of cobalt per liter as compared with 1 to 5 grams of cobalt per liter which are obtained when operating with conventional catalysts, as for example solid reduced cobalt catalysts. In addition the use of the acid cobalt sulphate solution reduces the amount of the higher boiling by-products known as the thick oils which are produced and which only have limited use. A further advantage is the fact that after completion of the reaction the aqueous cobalt solution may be very easily separated from the reaction products.

The oxo synthesis may be carried out either batchwise or by continuous operation. The batchwise operation is effected, for example, in autoclaves with stirrers in which the starting product is mixed with the catalyst or the catalyst solution followed by the introduction of the quantity of water gas required under pressure while heating the autoclave. The continuous operation of the oxo synthesis is effected in vertical pressure vessels into which the starting product is continuously admitted from below while continuously admixing the catalyst with it and introducing water gas under pressure through separate gas lines into the continuously flowing mixture of reactants. This working method has numerous disadvantages because a thorough mixing of the gaseous and liquid reactants can only be obtained with great difficulty.

Besides containing small amounts of cobalt and other metals of the 8th group of the periodic system in the form of organic compounds, especially as cobalt or iron carbonyl compounds, the reaction products obtained from the oxo synthesis contain to a certain extent acetals which form as by-products from the alcohols and aldehydes formed in the oxo reaction.

According to a new method proposed the separation of the metals dissolved in the oxo products and the cleavage of the acetals formed are effected by treating the primary oxo products, after the separation of the catalyst solution, with water under elevated pressure and at elevated temperature. This treatment with water is effected at temperatures between 100 and 250° C. and preferably between 160 and 230° C. The pressures are dependent on the reaction temperature and range, for example, between 15 and 35 kg./sq. cm. The treating times are determined by the temperature and pressure used and may be extended to as long as one hour. By this treatment with water under pressure the metals dissolved in the reaction mixture are precipitated as hydroxides while the acetals undergo a cleavage. The finished products are metal- and acetal-free mixtures which in addition to aldehydes and unconverted saturated hydrocarbons contained as early as in the first stage of the oxo reaction, thick oils.

If only alcohols are to be produced by the oxo synthesis, then the catalytic addition of water gas is followed by a hydrogenation which is easily effected in the conventional manner with suitable catalysts as for example with fixed bed nickel catalysts. By using gases rich in carbon monoxide and temperatures of preferably 180 to 200° C. products having a high content of alcohols may be obtained as earily as in the first stage of the oxo reaction.

Figure 2:
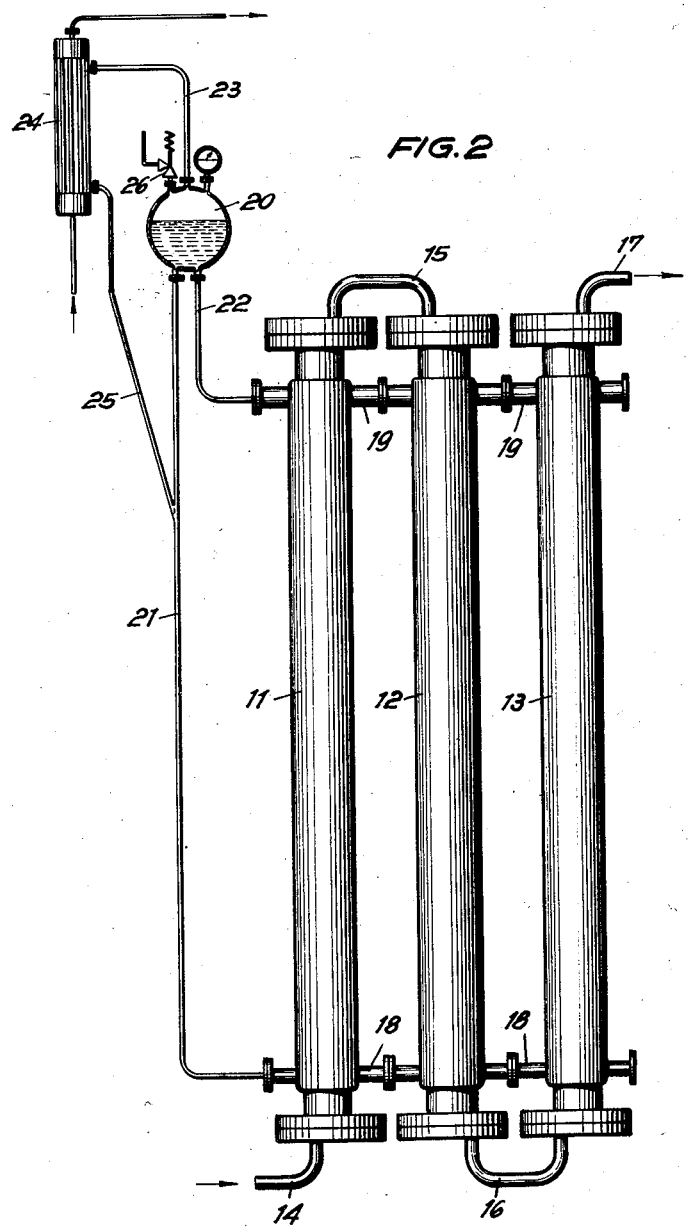

One object of this invention is an improved process for the continuous operation of the oxo synthesis. This and still further objects will become apparent from the following description read in conjunction with the drawings, in which:

Fig. 1 shows a vertical section of a reaction vessel in accordance with the invention, and Fig. 2 diagrammatically shows a group of connected reaction vessels for effecting the process in accordance with the invention.

It has now been found that the oxo synthesis and the after treatment required for the refining of the primary products formed may be effected with particular advantage in continuous operation if an intimate mixture consisting of unsaturated carbon compounds, such as olefinic hydrocarbons, aqueous salt solutions of suitable metals of the 8th group of the periodic system, carbon monoxide and hydrogen is passed under pressure through a relatively narrow and long reaction space, as for example formed by tubes, at such a velocity that no substantial separation of the mixture into component parts occurs. In the reaction spaces, the reactants are heated for a sufficient length of time to a temperature sufficient for the catalytic addition of water gas and are then continuously separated in a separator after passage through the reaction space into a gaseous, aqueous and oily phase. Preferably catalysts which consists of acid cobalt sulphate solutions are used.

After the separation of the gaseous phase and intimate mixing with water, the primary oxo products are freed in a similar manner in a narrow and long reaction space, such as in tubes of small diameter, from the remaining metal residues and from the acetals formed as by-product.

In the first stage of the process according to the invention the mixture prepared in a suitable manner from the starting material to be subjected to the oxo synthesis, from the aqueous catalyst solution and from the CO-H₂ gas such as water gas to be added is passed through reaction spaces, such as reaction tubes, which are very long relative to their cross section. These reaction tubes may be straight or in any other form such as in the shape of tubular coils. In the interior, they may be provided with devices which produce flow resistances. Most convenient is the use of tubular coils or of spirally wound reaction spaces which are immersed in a container filled with a heat exchange liquid, and preferably in a water bath. By means of the heat exchange liquids which, if necessary or desired, may be replaced by a steam jacket, the reaction temperature may easily be maintained at a constant level and the evolving reaction heat may effectively be removed due to the large exchange surface and the high flow velocity. The reaction tube may also pass through thermal baths of different temperature level thus exposing the reactants to temperatures which increase in the direction of their flow producing a desirable temperature gradient.

The reaction mixture may flow through the reaction tubes in any manner. It is most convenient to effect passage in an upward direction through the reaction tubes.

The intimate mixing of the reactants may be effected in any way. The oily feed product of the oxo synthesis may first be mixed with the aqueous catalyst solution in an intensive mixer or in a centrifugal pump. The liquids may be brought to the pressure required for the addition of the CO+H₂ gas either before the admittance to the centrifugal pump or after having left the same. Precompressed CO-H₂ gas is then introduced into the mixture by means of suitable devices such as by means of an injector or of a spray nozzle thereby effecting a still further intimate mixing of the reactants.

Instead of subsequently introducing the gas into the two-component liquid mixture, the CO-H₂ gas volume required for the oxo synthesis may be introduced simultaneously with the two liquid reactants into the suction nozzle of a high-compression centrifugal pump.

A reaction mixture prepared in such a manner is passed through narrow and long spaces at such a velocity that no or only a slight separation of the mixture into component parts occurs. In general, the velocity will be increased to a point that a turbulent flow will be reached and maintained. However, if the mixing of the reactants is a particularly intimate one, velocities at which a turbulent flow will not occur may be used.

The catalyst solution separated from the oxo products at the outlet of the reaction tube may be recycled to be reused in the process, which recycling may conveniently be effected without releasing the solution from pressure. The losses in metal and water must be made up. The CO-H₂ excess gas may remain in the cycle if quantities corresponding to the quantities and composition of gas withdrawn and consumed are replaced by the addition of fresh gas. In many cases it is of advantage if a portion of the liquid reaction products formed is left in the cycle.

It is also possible to introduce CO-H₂ gas such as water gas at various points of the reaction tube in order to maintain constant concentrations of carbon monoxide and hydrogen throughout the reaction space.

The narrow reaction tubes to be used in accordance with the invention should be fabricated from metals resistant to pressure and corrosion. Of particular advantage is the use of chrome-nickel steel tubes or of copper-plated tubes.

The oxo reaction is considerably accelerated if a surface of metallic iron or metallic cobalt is present in the reaction zone proper where the feed product reaches the reaction temperature. An iron wire, for example, may be provided for this purpose at a suitable place in the reaction tube. Instead of this, it is possible to provide parts of a reaction tube with an inner lining of iron or cobalt metal or with iron or cobalt turnings. In general, relatively small iron or cobalt surfaces will be sufficient since these metals only initiate the oxo reaction in the presence of aqueous cobalt sulphate solutions.

The other reaction conditions of the process according to the invention correspond to the known embodiment of the oxo synthesis. Gas pressures in excess of 50 kg./sq. cm. and preferably gas pressures of 100 to 150 kg./sq. cm. and temperatures of 120 to 220° C. and preferably 140 to 170° C. are generally used. The residence times are dependent on the starting product and may be as long as two hours; however, reaction times of 30 to 45 minutes will generally be sufficient.

After the main reaction according to the invention, the primarily formed oxo products are purified. The reaction product which after the termination of the water gas addition has been freed from the gaseous phase is emulsified with water and is again passed under elevated pressure and at elevated temperature through reaction tubes at such a velocity that no substantial demulsification of the mixture occurs. In this stage temperatures of between 100 and 250° C. and preferably of approximately 200° C. and treating periods of 10 to 20 minutes which, if necessary or desired, are prolonged to one hour, are maintained. The gas pressures are dependent on the treating temperature. The quantity of water added should be in excess of the theoretical quantity required for the cleavage of acetals. In general, the addition of 10 to 20% of water will be sufficient. The intimate mixing of the reactants which is effected by means of the same device as that used for mixing the starting products may be aided by the addition of emulsifiers.

After a sufficiently long residence time in the tube-like reaction vessel and after passage therethrough the oily phase is separated from the aqueous phase in a separating vessel and the formed precipitate of metal hydroxides is separated by filtration.

If desired, the purified oxo product may be converted into alcohols in the conventional manner in a subsequent hydrogenation stage.

An advantage of the process according to the invention is that the oxo synthesis and the purification of the reaction products may be carried out in a completely continuous manner in simple narrow tubes with comparatively thin walls without the use of costly large volume autoclaves which due to the high reaction pressure must have a considerable wall thickness and which in most cases even require additional internal members for the removal of the reaction heat.

If the process according to the invention is carried out in narrow tubes, any obstructions of the tubes or deposits of solid constituents formed at the inner surface of the tubes may only be determined and removed with great difficulty. The purification of the used tubular coils requires a time-consuming interruption of the operation and frequently even the disassembly of the tubes or the removal of the clogged tube sections.

These difficulties are not encountered if the process according to the invention is carried out in cylindrical pressure vessels which are provided in their interior with a thread or helix of low pitch. The outer edges of the screw surfaces forming the reaction channel should lie as close as possible to the inner wall of the cylindrical pressure vessel. The screw surface used to form the reaction channel is conveniently laid around a pole which is installed as screw spindle in the axis of the pressure vessel. In this way reaction channels of small cross section and of any length are easily formed. To obtain sufficiently long reaction paths, several pressure vessels provided with screw surfaces may be connected in series. In this case, the reaction mixture leaving the upper end of the pressure vessel is led in at the top of the following pressure vessel and vice versa.

For the removal of the evolved heat the pressure vessels are provided at their outer surfaces with a fluid-tight jacket. With this arrangement, the evolving heat is easily removed by means of evaporating liquids such as by means of water under pressure circulating between the jacket and the outer surface of the pressure vessel.

The cooling jackets of reaction spaces which are arranged in juxtaposition are conveniently combined into groups. The cooling medium flows from the cooling zones to the lower end of the reaction tubes while the vapors of the cooling agent forming due to the quantities of heat absorbed are withdrawn at the top of the cooling jackets and are passed to a vapor accumulator. Here, a separation between the still liquid and the evaporated cooling agent occurs. The evaporated cooling agent is condensed in a heat exchanger and returns along with the non-evaporated cooling agent into the cycle.

An embodiment of the reaction spaces to be used in accordance with the invention and described above is represented in the appended drawing in form of example.

This device consists of a tube 1 the wall thickness of which is adapted to the reaction pressure. On top and at the bottom the reaction tube 1 is sealed by flanges 2 and 3. Within the reaction tube 1 there is a screw spindle 4, around which a screw surface 5 runs. The outside diameter of the screw surface is so proportioned that the outer edges of the individual threads lie close to the inner surface of the pressure tube 1. The screw surface may be constructed in any manner such as, for example, from individual annular plates or from one single strip.

After having taken off the lower flange plate 3, the screw surface 5 with the spindle 4 can be removed. Even with a very low pitch of the screw the purification of the spirally arranged reaction channel offers no difficulty since all deposits formed on the screw surface, the screw spindle or at the inner wall of the pressure tube are freely accessible.

Elongated reaction spaces of any cross section may be obtained by correspondingly reducing the pitch of the screw. If, for example, the pressure tube 1 has a diameter of 50 mm., the screw spindle 4 has 10 mm. diameter and the screw surface has a pitch of 2 mm., then a reaction space of 40 sq. mm. cross section is available which would correspond to a tube of approximately 11 to 12 mm. diameter.

The reaction mixture may be admitted at the lower flange 3 through a pipe 6 and the mixture after having reacted for a sufficiently long time may be led off at the upper flange 2 through a pipe 7. However, it is also possible to operate with the reverse flow direction of the reactants.

The outer surface of the pressure tube 1 is surrounded by a liquid-tight and gas-tight sheet jacket which, for example, may be welded to the tube. The annular jacket space thus formed serves for the passage of the cooling medium which, for example, enters the lower end of the cooling jacket through pipe 9 while the evaporated portions of the cooling agent escape at the top of the reaction tube through pipe 10.

Figure 2 shows three reaction vessels 11, 12 and 13 connected in series. The reaction mixture previously prepared in suitable mixing devices and consisting of olefinic hydrocarbons, aqueous catalyst solution and water gas enters the base of reaction tube 11 through pipe 14. Through transition pipe 15 and 16 the reaction mixture passes into the two following tubes 12 and 13. The reaction mixture leaves the pressure vessel at the top of the last tube and is then separated into gaseous, oily and aqueous constituents by means of a separating vessel.

The cooling spaces of all reaction tubes are interconnected at the lower end by pipes 18 and at the upper end by pipes 19. In the vapor accumulator 20 there is a stock of the cooling agent used which is led through pipe 21 to the base of the cooling jackets surrounding the reaction tubes. From the upper end of the tube group 11/13 the vapors of the cooling agent formed by heat absorption are conducted by means of pipes 19 into the vapor accumulator where a separation into liquid and gaseous constituents takes place.

The vapors of the cooling agent pass through pipe 23 into a heat exchanger 24 where they are used for the generation of operating vapor or for heating the operating solutions. The vapors thus condense and return through pipe 25 and then, together with the cooling medium separated in the liquid form in vapor collector 20, pass through pipe 21 to the lower end of the reaction tubes. By means of a throttle valve 26 which allows vapor to blow off at a certain pressure, the cooling temperature may be maintained at a constant level in the conventional manner. The device according to the invention may be modified in various ways within the scope of the invention. The group-wise combined reaction vessels may, for example, be connected in series or may partially be connected in series and partially in parallel. It is possible to connect all of the reaction tubes to a common cooling cycle if the same reaction temperature must be maintained in all sections of the process. If reaction zones with different temperature levels are required, then the reaction vessels or groups of vessels are connected to separate vapor accumulators the vapor pressure of which is maintained at a different level corresponding to the temperature of the vapors of the cooling agent.

Deviating from the embodiment represented in the drawing, the removal of the reaction heat may be effected in any other way as, for example, by the use of non-evaporating media or by continuous removal of the vapors of the cooling agent. It is also possible to form the screw spindle 4 as a tube and to provide it with an inlet and an outlet for the cooling media. In this matter a particularly effective cooling of the reaction mixture is possible.

*Example 1*

An intimate mixture consisting of 2 liters of olefinic hydrocarbon mixture, 1 liter cobalt sulphate solution and 800 std. liters of water gas was passed hourly under a gas pressure of 150 kg./sq. cm. into a coil of copper tube of 4 mm. inside diameter and 400 m. length placed in a water bath heated to 150° C. The olefinic starting material consisted of a $C_8$ fraction obtained from the catalytic hydrogenation of carbon monoxide and had the following characteristics:

| | |
|---|---:|
| Iodine number | [1] 149 |
| Neutralization number | 0 |
| Ester number | 1 |
| Hydroxyl number | 4 |
| Carbonyl number | 2 |

[1] Equal to an olefin content of 66%.

The catalyst used was an aqueous cobalt sulfate solution which contained 8 gms. of cobalt per liter and was acidified by means of oxalic acid to a pH value of 5. Moreover, it contained 15 gms./liter of MgO in the form of magnesium sulphate.

The water gas used contained 45% by volume of carbon monoxide and 44% by volume of hydrogen.

The aqueous catalyst solution and the olefinic starting material were mixed by means of a centrifugal pump. Then the mixture was compressed to 150 kg./sq. cm. by means of a high pressure pump. The water gas which had likewise been precompressed to 150 kg./sq. cm. was fed into the pressure line of the high pressure pump by means of an injector.

The mixture of the reactants was fed in at the lower end of the copper coil and was passed from the top of the coil into a separating vessel kept under pressure where the gas, the aqueous and the oily liquid separated from one another.

Approximately 40 meters after the beginning of the copper coil, an iron wire of 50 m. length and 2 mm. diameter was inserted into the reaction tube.

The oily product withdrawn from the settling vessel had the following characteristics:

| | |
|---|---|
| Iodine number | 7 |
| Neutralization number | 4 |
| Ester number | 6 |
| Hydroxyl number | 19 |
| Carbonyl number | 208 |

As indicated by the iodine numbers, more than 95% of the olefins charged to the reaction had been converted.

The separated aldehyde mixture was mixed with 20% by volume of water by means of a centrifugal pump and was passed from below through a coil of copper tube of 4 mm. inside diameter and 50 m. length which was placed in a water bath heated to 200° C. In a separating vessel downstream of the copper coil, the admixed water was separated. The oily product obtained after filtration had the following characteristics:

| | |
|---|---|
| Iodine number | 7 |
| Neutralization number | 4 |
| Ester number | 6 |
| Hydroxyl number | 29 |
| Carbonyl number | 213 |

Before the treatment with water, the metal content was 20 mg. cobalt per liter; after the treatment with water, the product was free from cobalt. The increase in hydroxyl number and carbonyl number effected by the clevage of acetals is to be seen from the values given above.

By subsequently hydrogenating the reaction product in the conventional manner over nickel catalyst, an alcohol-containing product having the following characteristics was obtained:

| | |
|---|---|
| Iodine number | 2 |
| Neutralization number | 3 |
| Ester number | 6 |
| Hydroxyl number | 242 |
| Carbonyl number | 0 |

*Example 2*

An oleic acid glycol ester was obtained by esterification from free oleic acid ($C_{18}H_{34}O_2$) and ethylene glycol. It had the following characteristics:

| | |
|---|---|
| Neutralization number | 0.3 |
| Ester number | 190 |
| Hydroxyl number | 1 |
| Iodine number | 83 |
| Carbonyl number | 1 |
| Density at 20° C | 0.907 |
| Refractive index $n_D^{20}$ | 1.4680 |

This oleic acid glycol ester was diluted with an equal volume of benzene and then treated in accordance with Example 1 in a continuous manner at elevated pressure and temperature with a carbon monoxide-hydrogen mixture with the use of an aqueous cobalt sulphate solution.

The reaction product thus obtained was at first hydrated with water in the manner described in Example 1 and subsequently hydrogenated at 150° C. with the use of a nickel-magnesia-kieselguhr catalyst. Then the benzene was distilled off. The final product was a Vaseline-like product which had the following characteristics:

| | |
|---|---|
| Neutralization number | 4 |
| Ester number | 173 |
| Hydroxyl number | 168 |
| Carbonyl number | 0 |
| Iodine number | 2 |

*Example 3*

A terpene fraction which chiefly consisted of camphene ($C_{10}H_{16}$) was separated from refined Portuguese turpentine which had a boiling point of 153° C. This fraction was continuously treated with a carbon monoxide-hydrogen mixture in the manner described in Example 1 and with the use of the catalysts used therein. This resulted in a reaction product which had the following characteristics:

| | |
|---|---|
| Iodine number | 22 |
| Carbonyl number | 139 |
| Hydroxyl number | 34 |
| Neutralization number | 3 |
| Ester number | 17 |

This reaction product was treated for 30 minutes under superatmospheric pressure and at 180–200° C. with water. Thereafter, the product had the following characteristic:

| | |
|---|---|
| Density at 20° C | 0.940 |
| Refractive index $n_D^{20}$ | 1.4795 |
| Iodine number | 23 |
| Carbonyl number | 151 |
| Hydroxyl number | 75 |
| Neutralization number | 9 |
| Ester number | 13 |

*Example 4*

Free oleic acid ($C_{18}H_{34}O_2$) having the characteristics:

| | |
|---|---|
| Density at 20° C | 0.896 |
| Iodine number | 90 |
| Neutralization number | 200 | was mixed with toluene in a molar proportion of 1:4 and treated in accordance with Example 1 in a continuous manner with a carbon monoxide-hydrogen mixture. The aldehydic reaction products forming thereby had the following characteristics in the raw state:

| | |
|---|---|
| Iodine number | 0 |
| Neutralization number | 72.5 |
| Ester number | 12 |
| Hydroxyl number | 7 |
| Carbonyl number | 79 |

For the removal of the dissolved organic iron compounds which caused the dark colour of the product, the product was mixed with a 5% sulfuric acid and subsequently washed with water. Following this, the toluene used as diluting agent was distilled off. The final product obtained thereby had the follow characteristics:

| | |
|---|---|
| Density at 20° C | 0.914 |
| Iodine number | 1 |
| Saponification number | 184 |
| Acid number | 164 |
| Hydroxyl number | 15 |
| Carbonyl number | 152 |

Instead of acid cobalt sulphate solutions, the process may be carried out with solutions of cobalt chloride or cobalt acetate without the necessity of changing the working conditions set forth in the examples. The $H_2:CO$ ratio of the carbon monoxide-hydrogen mixtures may vary within the limits of 1:3 and 3:1. Of particular advantage is the use of gases which contain equal parts by volume of hydrogen and carbon monoxide.

Hydrocarbons having one or several double bonds are suitable for carrying out the process according to the invention. The hydrocarbons may be of aliphatic, cyclo-aliphatic or aromatic-aliphatic nature. However, the double bonds must be positioned in the aliphatic or cyclo-aliphatic part. Besides unsaturated hydrocarbons, it is possible to process unsaturated alcohols, ethers, acids and esters as indicated in the preceding examples.

We claim:

1. In the oxo synthesis process, in which an olefinic unsaturated carbon compound is contacted with carbon monoxide and hydrogen in the presence of an aqueous salt solution of cobalt at a temperature of between about 120 and 220° C. and a pressure in excess of about 50 kg./sq. cm., the improvement for continuous operation, which comprises passing an intimate mixture of said unsaturated carbon compound, carbon monoxide, hydrogen, and aqueous salt solution of cobalt through a long, narrow, reaction zone defined by a helix of low pitch positioned in an elongated, cylindrical pressure vessel at a flow velocity sufficient to cause turbulence and thereby prevent separation of the mixture, and thereafter separating the reaction product formed into gaseous, aqueous and oily constituents.

2. Process according to claim 1, in which said separated oily constituents, which contain aldehyde, are intimately mixed with water and passed at a temperature of about 100 to 250° C. through a long, narrow, reaction zone defined by a helix of low pitch positioned in an elongated, cylindrical vessel at a flow velocity sufficient to cause turbulence and thereby prevent separation of the mixture, into its component parts, and thereafter separating the mixture into its aqueous and oily constituents.

References Cited in the file of this patent

UNITED STATES PATENTS

| | | |
|---|---|---|
| 2,265,837 | Harding | Dec. 9, 1941 |
| 2,517,339 | Offutt et al. | Aug. 1, 1950 |
| 2,562,993 | Sensel et al. | Aug. 7, 1951 |
| 2,564,104 | Gresham et al. | Aug. 14, 1951 |
| 2,564,130 | Schreyer | Aug. 14, 1951 |
| 2,576,113 | Hagemeyer | Nov. 27, 1951 |
| 2,600,871 | Helwig | June 17, 1952 |
| 2,695,315 | Parker | Nov. 23, 1954 |

FOREIGN PATENTS

| | | |
|---|---|---|
| 646,424 | Great Britain | Nov. 22, 1950 |

OTHER REFERENCES

I. G. Farben Patent Application 173,072 IVd/120 (O. Z. 13,634), T. O. M. Reel 36. Deposited in the Library of Congress March 12, 1946. Translation available in "Oxo Process" Meyer Translation PC–S–V, pgs. 57–59.

I G. Farben Patent Application 174,142 IVd/120 (O. Z. 13,947), T. O. M. Reel 36. Deposited in the Library of Congress March 12, 1946. Translation available in "Oxo Process" Meyer Translation PC–S–V, pgs. 68–69.